UNITED STATES PATENT OFFICE.

VICTOR BARJON, OF NEW YORK, N. Y.

IMPROVEMENT IN LIQUIDS FOR GALVANIC BATTERIES.

Specification forming part of Letters Patent No. 116,917, dated July 11, 1871.

*To all whom it may concern:*

Be it known that I, VICTOR BARJON, of the city, county, and State of New York, have invented a new and Improved Liquid for Galvanic Batteries; and I do hereby declare the following to be a full, clear, and exact description thereof, which will enable those skilled in the art to make and use the same.

This invention relates to a liquid for galvanic batteries, which is made by mixing a solution of bichromate of potash with a small quantity of lime and with sulphuric acid. In carrying out my invention, I take a gallon of water and heat it to the boiling point; then I introduce therein two pounds of bichromate of potash and allow the same to dissolve. When the solution is perfect I allow the temperature to go down to about 68°, and then I add thereto two ounces of lime. The liquid is then stirred for some minutes and mixed with sulphuric acid until its gravity reaches 35° Baumé. The mixture is then again stirred for a few minutes, and then it is left standing for twenty-four hours, when it is ready for use.

This liquid, when poured into the porous cup of a Bunsen battery, replaces with advantage the nitric acid, and also all other liquids which have been used in this battery, and by its use the energy, durability, and constant action of said battery are materially improved and the battery is made to work without odor. By the addition of lime to the liquid the carbonic acid of the air is absorbed during the operation of the battery and the action of the battery is rendered constant.

I am aware that it is not new to use chromic acid in connection with sulphuric acid and bichromate of potash, as claimed by E. Prevost; but

What I claim as new, and desire to secure by Letters Patent, is—

A liquid for galvanic batteries, prepared substantially in the manner herein set forth.

This specification signed by me this 16th day of June, 1871.

V. BARJON.

Witnesses:
W. HAUFF,
E. F. KASTENHUBER.